United States Patent [19]

Coffman

[11] 3,898,065
[45] Aug. 5, 1975

[54] LINT COLLECTOR
[75] Inventor: Robert B. Coffman, Cary, Ill.
[73] Assignee: Norman Dryer Co., Inc., Crystal Lake, Ill.
[22] Filed: Oct. 9, 1973
[21] Appl. No.: 404,430

[52] U.S. Cl. ............ 55/301; 55/314; 55/418; 55/498
[51] Int. Cl. ............................... B01d 41/04
[58] Field of Search ............ 55/302, 312, 301, 314, 55/320, 328, 478, 418, 480, 498; 209/250, 256, 258, 268

[56] References Cited
UNITED STATES PATENTS

| | | | |
|---|---|---|---|
| 2,058,919 | 10/1936 | Sewell | 55/314 X |
| 3,250,389 | 5/1966 | Scruby et al. | 209/250 |
| 3,423,906 | 1/1969 | Fried | 55/302 |
| 3,486,309 | 12/1969 | Wild | 55/302 X |
| 3,719,276 | 3/1973 | Allen et al. | 209/256 X |
| 3,775,949 | 12/1973 | Wächter | 55/312 |

*Primary Examiner*—Frank W. Lutter
*Assistant Examiner*—William Cuchlinski, Jr.

[57] ABSTRACT

A lint separator, for use with a fabric dryer, having a housing, a horizontal filtering screen dividing the housing into an upper and a lower portion, an air inlet into one end of the housing below the screen, an air outlet opposite the inlet above the screen, a lint outlet also opposite the inlet but below the screen, and valves in each of said outlets for the discharge of filtered air or for the discharge of collected lint.

8 Claims, 4 Drawing Figures

LINT COLLECTOR

BACKGROUND OF THE INVENTION

In U.S. Pat. No. 3,423,906 issued Jan. 28, 1969, to Robert A. Fried and entitled "Apparatus for Removing Particles from Air," there is shown a lint separator over which this invention is designed to improve. That separator directs exhaust air from a clothes drier initially upward and then downward into a tubular filtering element. The air is directed to the inside of the filter for filtering. For cleaning the filter and discharging the collected lint, the air flow direction is altered to flow from the exterior of the filter into it. A trap door below the filter retains the lint or opens for lint discharge in filter cleaning.

SUMMARY OF THE INVENTION

Briefly, this invention contemplates a nonvertical filtering element dividing a chamber into an upper and a lower part, and filtering air by upward passage through the filter. More specifically, the present invention contemplates a chamber with a horizontal flat filter element within it dividing it in two, and an inlet port into the chamber below the filter. At the opposite end of the chamber, a filtered air outlet is provided above the filter and a lint clean-out port below the filter. Each outlet has a gate to be opened or closed. Within the chamber below the filter is a movable deflector having its upstream end near the inlet port which, in filtering position, distributes the air to the whole surface of the filter, but generally away from the upstream end of the filter. In clean-out position it directs the major part of the incoming air through the bottom of the chamber to sweep out the collected lint. It also directs a minor part of the air against the filter at a shallow angle to knock off adherent lint. The lint is carried out the discharge into a porous, lint-collecting bag of burlap, for instance.

The advantages of this device are substantial. It needs substantially less overhead accomodation. It is notably simpler and cheaper. The clean-out air flow impinges on the same side of the filter as the filtering flow so that all air, whether for filtration or clean-out is filtered. (The lint collecting bag in the latter instance is the filter). Thus the dryer can be operated continuously and the collector cleaned as needed without regard to the situation of the dryer. The flat filter element, a metal screen, has no rigidity. It is largely self-cleaning and thus, non-clogging. As lint collects on its under side, it generally falls to the floor of the chamber. However, in clean-out, the fraction of air directed against the screen causes a flutter or ripple in it which effectively dislodges the lint.

DESCRIPTION OF THE PREFERRED EMBODIMENT

Figure 1:
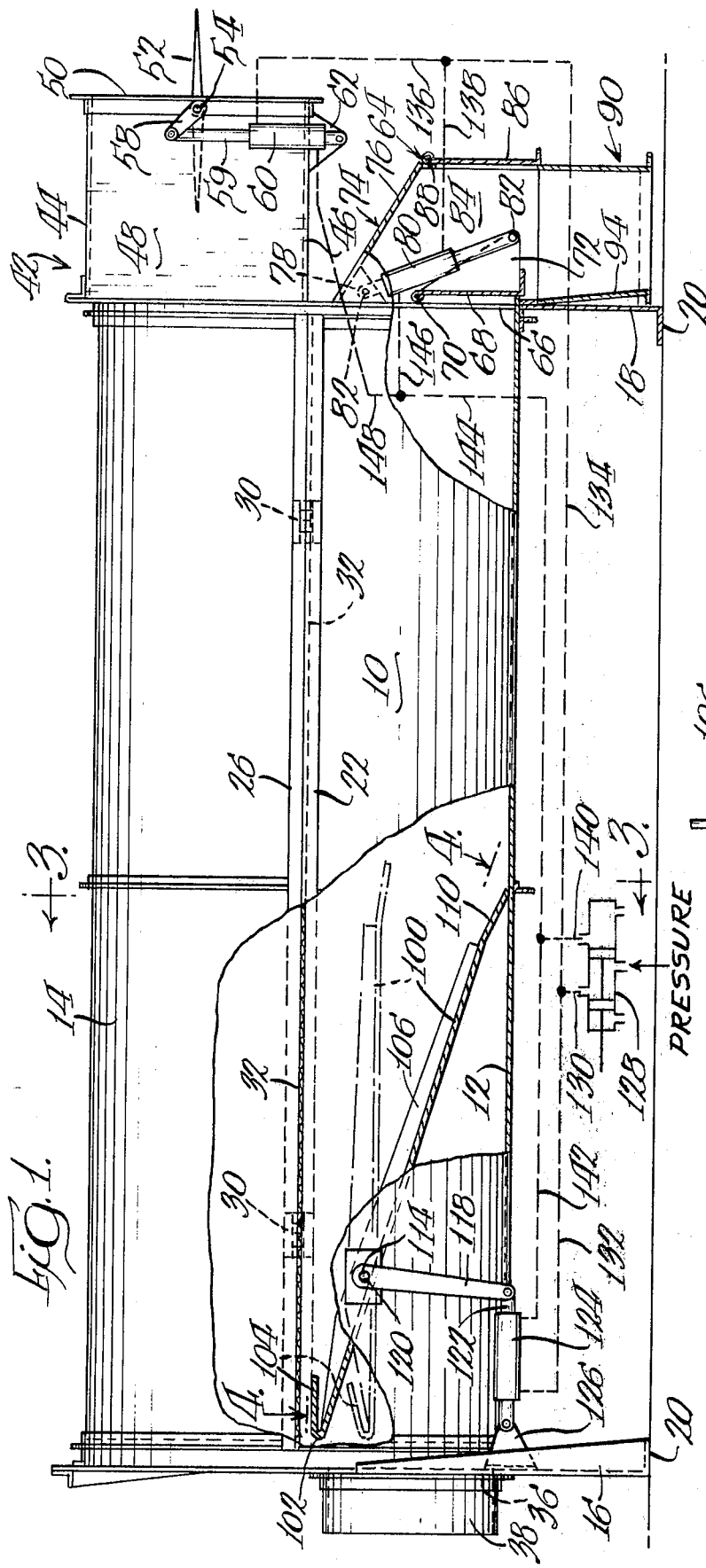
FIG. 1 is a side elevation of an air filter embodying the present invention broken away in part to show certain internal structure.
Figure 4:
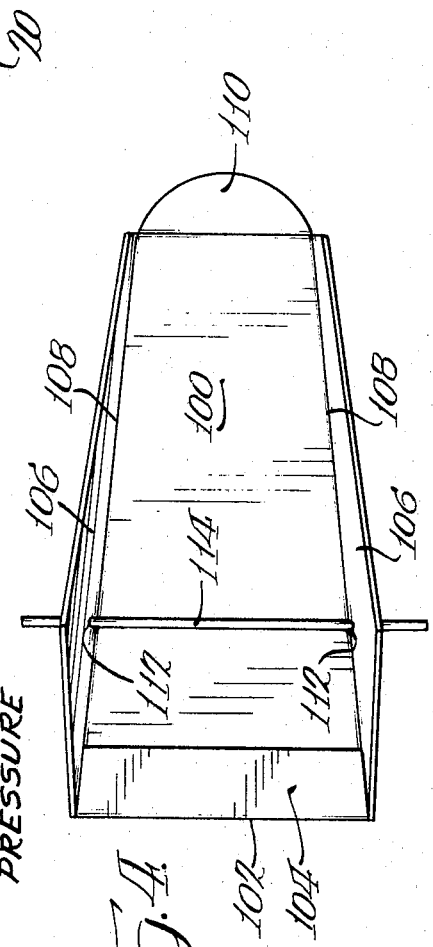
FIG. 4 is a top plan view of the deflector.
Figure 2:
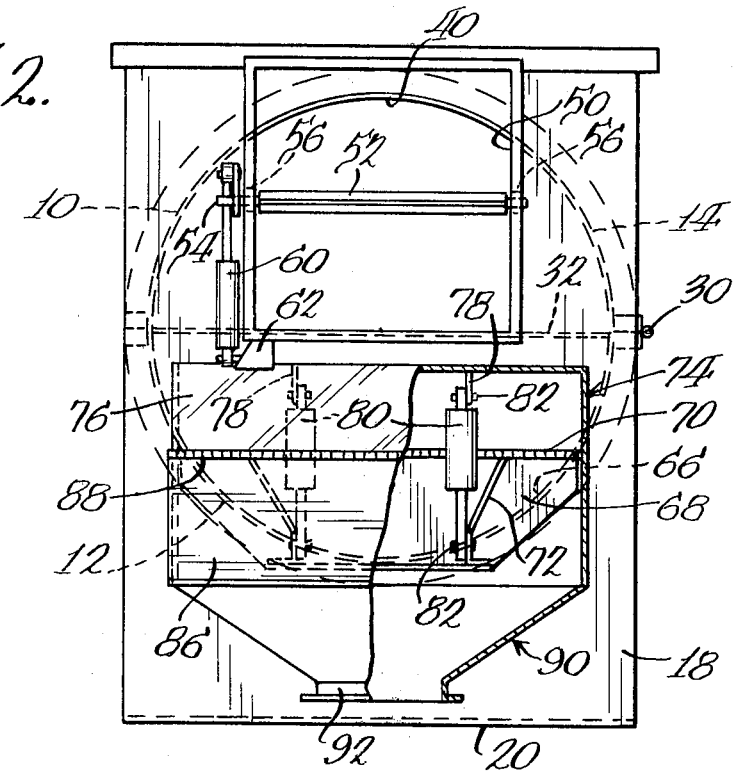
FIG. 2 is an elevation of the discharge end of the filter, the right end of FIG. 1, broken away in part.
Figure 3:
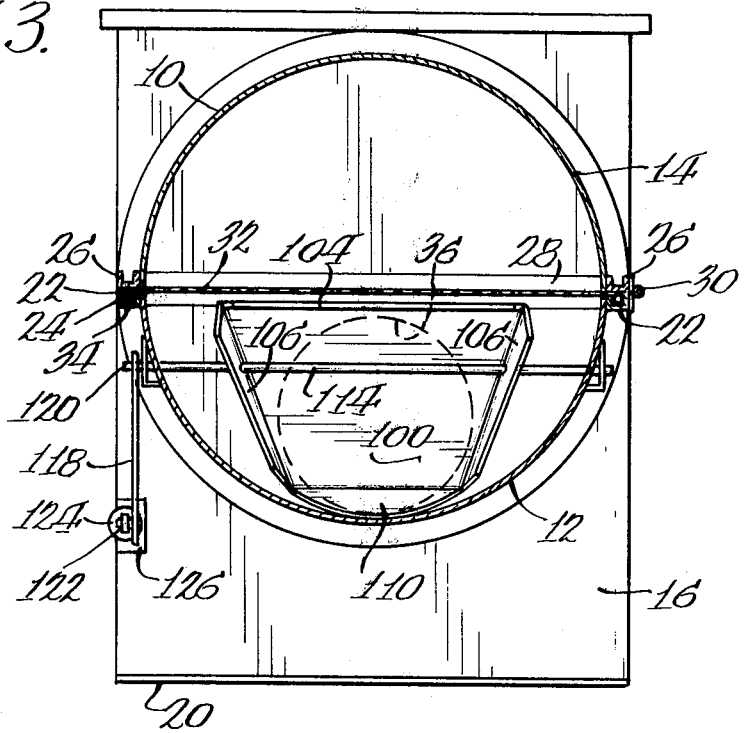
FIG. 3 is a section taken along the line 3—3 of FIG. 1 looking in the direction of the arrows.

The illustrated filter or separator includes a horizontally oriented relatively long cylindrical housing 10 horizontally longitudinally divided into a semi-cylindrical bottom 12 and a semi-cylindrical cover 14. The bottom has a rectangular inlet end plate 16 secured to one end and a like rectangular outlet end plate 18 secured to the other end. The end plates 16 and 18 extend substantially below the housing 10 to constitute feet 20 for the separator and slightly above the level of the cover 14 when the cover is closed. Channels 22 are secured along the top edges of the bottom 12 and across the end plates, channeled side up, to define a continuous groove 24 about the top edge of the bottom.

The cover is a semi-cylindrical rolled sheet of metal having up-facing channel 26 secured externally along its longitudinal edges and lengths 28 of like oriented channel spanning the chords at the ends of the cover, all of which present a flat surface to the groove 24 of the bottom. The cover is hinged to the bottom along its back longitudinal edge by hinges 30 spanning the opposed channels of bottom and cover. A fine metal screen 32 constituting the filter covers the entire bottom and is held in place by flexible tubing 34 seated and seating the edges of the screen in the groove 24.

The inlet end plate 16 has a large diameter inlet hole 36 therein surrounded by a collar 38 for attachment of the collector to a dryer. The inlet 36 is situated in the lower half of the housing or below the screen 32.

The outlet plate 18 is semi-circularly cut out at 40 in register with the cover so as to provide a wide open end of the housing at the outlet end above the screen. A box 42 with parallel top 44 and bottom 46 and convergent sides 48 is secured to the outside face of the outlet plate to enclose the outlet or discharge cutout 40 and provide a rectangular filtered air discharge port 50 therefor. A rectangular butterfly valve 52 is centrally mounted to a horizontal shaft 54 which extends through bearings 56 in the sides 48 of the outlet box 42. A crank arm 58 is mounted to one end of the shaft 54 outside the outlet box 42 and is connected to the rod 59 of a fluid pressure cylinder 60. The other end of the cylinder 60 is pivotally mounted to a stationary bracket 62 attached to the underside of the box 42. Extension of the rod 59 opens the valve 52; retraction closes it.

The outlet plate 18 also has a less-than-semicircular cutout 66 therein conforming to and alined with the lower portion of the bottom 12. An outwardly opening lint door 68 is hinged as at 70 along its top edge to the top edge of the cutout 66. The door has a pair of triangular, outwardly extending, generally vertical brackets 72 secured thereto.

The cutout 66 and door 68 are enclosed by a shroud 74 consisting of a horizontally oriented, downwardly and outwardly extending top 76 secured to the outlet plate 18 above the door 68. Vertical gussets 78 are located in the under angle between the shroud top 76 and the end plate 18. Fluid pressure cylinders 80 are situated between appropriate mounting pins 82 on the gussets and the outermost points of the brackets 72 for opening and closing the door 68.

The shroud likewise possesses vertical side walls 84 and an inspection door 86 hinged as at 88 along its top edge to the outer edge of the shroud top 76. The door will be latched shut in any appropriate fashion, but may be opened for inspection, adjustment or repair of the lint door 68.

Under the inspection door 86 and the vertical sides 84, the shroud converges as at 90 to a square bagging flange 92 to which a lint collecting bag may be attached. In order that the flange 92 stand away from the end plate 18 so that a bag can encircle it, the lower convergent portion of the shroud includes an inner wall 94 extending from end plate 18 below the lint door 68 at a slight angle to the vertical to the bagging flange 92.

Interiorly of the housing, and below the screen 32 is situated a deflector 100. It is a long, double-tapering, tongue-like member about half the length of the housing and located adjacent the inlet end. It is formed from a metal sheet having its maximum width at a point about one-third of its length from the inlet end. From this transverse line, it forms generally a trapezoid in each direction. The inlet edge 102 has a rectangular extension 104 formed thereon which is bent back upon the principal body to form a lip making about a 20° angle therewith on the top side thereof. The lateral edges 106 are bent up through about 45° as at 108 starting at the leading or inlet edge as defined by the 20° angle, the lines of bend converging slightly. The outlet edge has a shallow, convexly curved extension 110 from the ends of the lateral up-bends 108 which is inclined slightly downward, defining an outlet end tip.

At the point of greatest width, a pair of elliptical holes 112 are formed in the up-bent lateral edges to receive a shaft 114 which extends across the housing bottom 12 on a line below the top plane thereof. The shaft ends extend through holes in the bottom and are received in journals 116 secured to the exterior of the bottom as by welding or riveting. The deflector is secured to its shaft 114 as by welding or the like to be positioned by rotation of the shaft.

A crank arm 118 is secured to end 120 of shaft 114. The free end of the crank arm is pivotally secured to the rod 122 of a fluid pressure double-acting cylinder and piston combination 124, the cylinder of which is pivotally mounted to a bracket 126 on the inlet end plate 16.

As will be evident from the drawings, retraction of the cylinder 124 moves the deflector 100 to an inclined position where the inlet edge 102 immediately underlies the filter screen 32 above the inlet port 36 with the lip 104 about parallel to the screen. The outlet end tip 110 rests against the floor of the housing bottom 12 to position the up-bent lateral edges of the deflector in properly spaced relation from the up-curving sides of the housing bottom, on the order of 1 to 2 inches, to the extent that the straight sides of the deflector conform to the long half-oval which the projected deflector sides make in intersecting the cylindrical housing.

Extension of the rod 122 moves the deflector 100 to a position generally parallel to the filter screen 32 and drops the inlet edge 102 below the top edge of the inlet hole 36. The lip 104 thus extends angularly upward toward the screen to deflect a portion of the incoming air through the inlet hole directly angularly at the screen.

The control of the operation of the device may be integrated by a single two way fluid valve, 128, manually or solenoid operated. One side 130 of the valve may be connected in parallel relation to the head end of the deflector cylinder 124, the rod end of the butterfly valve cylinder 60 and the rod end of the lint door cylinders 80 by ducts 132, 134, 136 and 138. The other side 140 of the valve 128 will be connected in parallel to the other ends of the cylinders by ducts 142, 144, 146 and 148. Thus, operation of the valve 128 to its filtering position closes the lint door 68, opens the butterfly valve 52 and moves the deflector 100 to its inclined position. Operation of the valve 128 to its lint discharge position simultaneously closes the butterfly valve 52, opens the lint door 68 and raises the deflector 100 to the horizontal position.

The operation of this device will be readily apparent from the foregoing description. The inlet 38 will be connected to a dryer. With the device arranged for filtration, the butterfly valve 52 for the air outlet 50 will be open, the lint door 68 will be closed and the deflector in its downwardly inclined position. So positioned, the entire input of the inlet is deflected by the deflector escaping around the long edges of the deflector and so distributing the air to the entire surface of the filter screen and particularly avoiding a concentration of filtration immediately adjacent the inlet end. Lint is deposited on the under side of the screen, and, generally, as it accumulates and compacts, it falls to the bottom of the housing toward the outlet end. It will be appreciated that the filter screen cannot practicably be and desirably is not stretched tight. Thus, there will be an upward and downward bellying as the dryer is operated or shut off which assists in the clearing of the screen.

When it is desired to empty the collector, a burlap or similar bag will be attached to the bagging flange 92 and valve 128 operated to the lint discharge position. The lint door 68 opens, the butterfly valve 52 closes and the deflector moves to its horizontal position, thus exposing the lint in the bottom of the housing to the unimpeded sweep of incoming air and carrying it out the lint door for bagging. In the meantime, that portion of air entering above the deflector is directed by the lip 104 at a shallow angle against the filter screen to dislodge adherent lint and also impose a flutter on the screen which additionally works to clean it.

I claim:

1. A collector for separating entrained particulate matter from a stream of air discharging from a fabric dryer and the like; comprising means defining a chamber, a substantially horizontally disposed filter screen within said chamber dividing said chamber into an upper part and a lower part, means defining an air inlet into one end of said chamber below said screen adapted to receive said stream, said means being the only inlet to said chamber, means defining an air outlet from said chamber above said screen, means defining an outlet below said screen and generally opposite said inlet for accumulated particulate matter, and means for selectively opening and closing said outlets, said stream serving to blow accumulated particulate matter from said chamber below said screen when said outlet above said screen is closed and said particulate matter outlet is open.

2. The combination as claimed in claim 1 including additionally a baffle within said chamber below said screen and having an up-stream end adjacent said inlet and sloping downwardly toward said particulate matter outlet, said baffle being shaped to avoid narrowly the sides of said chamber and to intercept at least a major portion of the air entering said inlet, thereby to distribute said air over a major portion of said screen.

3. The combination as claimed in claim 2 wherein said baffle is movable from said downwardly sloping position.

4. The combination as claimed in claim 3 wherein said baffle is pivoted intermediate its length and is movable to a position where a portion of said inlet air is directed at a shallow angle against the under side of said screen.

5. The combination as claimed in claim 4 wherein said baffle has an extension on the inlet edge thereof bent backwardly over said baffle at a sharply acute angle to the plane of said baffle, said extension directing said inlet air portion against said screen when said baffle is parallel to said screen.

6. The combination as claimed in claim 1 including additionally flow directing means within said chamber for optionally distributing inlet air over a substantial area of said screen for filtration and for directing a portion of said inlet air generally parallel to the floor of said chamber to sweep collected particulate matter out said particulate matter outlet.

7. The combination as claimed in claim 6, said flow directing means including additionally means for diverting another portion of inlet air at a shallow angle against said screen to dislodge particulate matter from said screen when said flow directing means is arranged for air flow parallel to said floor.

8. The combination as claimed in claim 1 wherein said filter screen is generally planar.

* * * * *